US012650859B2

(12) United States Patent
Golyshko et al.

(10) Patent No.: US 12,650,859 B2
(45) Date of Patent: Jun. 9, 2026

(54) ASSOCIATION OF MEDIA DEVICE PROFILES AND APPLICATION PROFILES FOR A SEAMLESS VIEWING EXPERIENCE

(71) Applicant: ROKU, INC., San Jose, CA (US)

(72) Inventors: Philip Golyshko, Westminster, CO (US); Kimberly Tran, San Jose, CA (US)

(73) Assignee: ROKU, INC., San Jose, CA (US)

( * ) Notice: Subject to any disclaimer, the term of this patent is extended or adjusted under 35 U.S.C. 154(b) by 174 days.

(21) Appl. No.: 18/495,376

(22) Filed: Oct. 26, 2023

(65) Prior Publication Data

US 2025/0138843 A1 May 1, 2025

(51) Int. Cl.
| | |
|---|---|
| *G06F 9/451* | (2018.01) |
| *G06F 3/0484* | (2022.01) |
| *G06F 9/445* | (2018.01) |
| *G06F 21/62* | (2013.01) |

(52) U.S. Cl.
CPC ............ *G06F 9/451* (2018.02); *G06F 3/0484* (2013.01); *G06F 9/4451* (2013.01); *G06F 21/629* (2013.01)

(58) Field of Classification Search
CPC ...... G06F 9/451; G06F 9/4451; G06F 3/0484; G06F 21/629
See application file for complete search history.

(56) References Cited

U.S. PATENT DOCUMENTS

| | | | | |
|---|---|---|---|---|
| 9,003,315 B2 * | 4/2015 | Behar | ................... | G06F 3/0362 |
| | | | | 715/764 |
| 11,539,686 B2 * | 12/2022 | Caldwell | ............... | H04L 67/306 |
| 11,831,958 B2 * | 11/2023 | Iyer | .................... | H04N 21/4532 |
| 11,874,808 B1 * | 1/2024 | Kondal | ................... | G06F 16/21 |
| 2009/0303676 A1 * | 12/2009 | Behar | ................. | G06F 16/9577 |
| | | | | 707/E17.014 |
| 2012/0303476 A1 * | 11/2012 | Krzyzanowski | ........ | G06F 16/00 |
| | | | | 705/26.61 |
| 2013/0080911 A1 * | 3/2013 | Klemm | ................. | G06F 16/958 |
| | | | | 715/745 |
| 2016/0063226 A1 * | 3/2016 | Singh | ..................... | H04L 69/14 |
| | | | | 726/19 |
| 2025/0097511 A1 * | 3/2025 | Lal | ................... | H04N 21/47202 |

* cited by examiner

*Primary Examiner* — Tadesse Hailu
(74) *Attorney, Agent, or Firm* — Sterne, Kessler, Goldstein & Fox P.L.L.C.

(57) ABSTRACT

Disclosed herein are system, apparatus, article of manufacture, method and/or computer program product aspects, and/or combinations and sub-combinations thereof, for reducing prompt-based interruptions for a user of a media device having an operating system (OS). An example aspect operates by configuring a user interface (UI) of an OS based on a first-user OS profile corresponding to a first user, wherein the first-user OS profile is associated with a unique identifier of the first user. The embodiment receives a command to launch a first application. The embodiment, in response to receiving the command, determines that a unique identifier of a most recent active profile used on the media device matches the unique identifier of the first user. The embodiment, in response to the determining, configures a UI of the first application based on the most recent active profile. The embodiment then outputs the UI of the first application.

17 Claims, 7 Drawing Sheets

Multimedia Environment 102

Media Device 106

202 Streaming Module

204 Processing Module

206 User Interface Module

216 Audio Command Processing Module

212 Audio Decoder(s)

214 Video Decoder(s)

208 Storage/Buffers

400

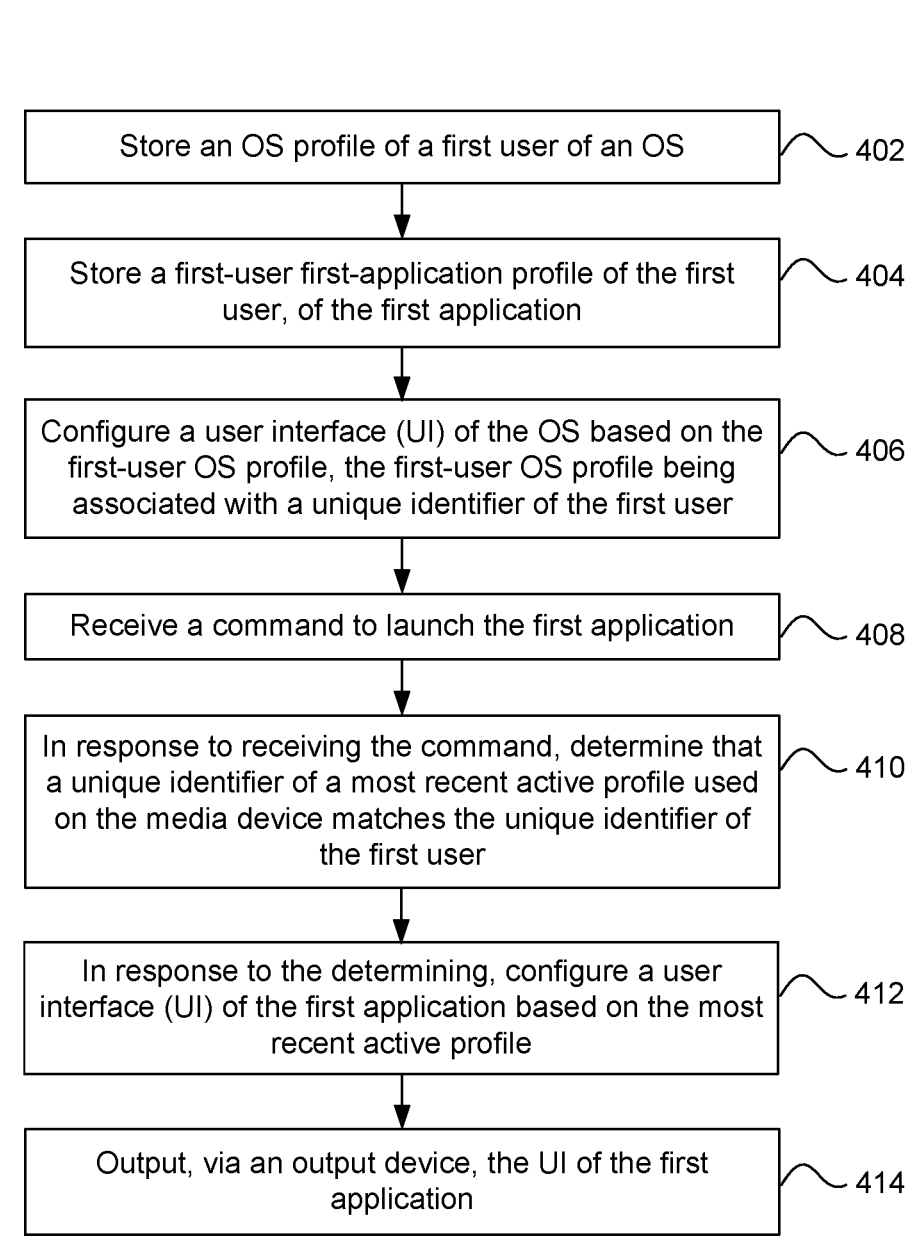

| Store an OS profile of a first user of an OS | 402 |

| Store a first-user first-application profile of the first user, of the first application | 404 |

| Configure a user interface (UI) of the OS based on the first-user OS profile, the first-user OS profile being associated with a unique identifier of the first user | 406 |

| Receive a command to launch the first application | 408 |

| In response to receiving the command, determine that a unique identifier of a most recent active profile used on the media device matches the unique identifier of the first user | 410 |

| In response to the determining, configure a user interface (UI) of the first application based on the most recent active profile | 412 |

| Output, via an output device, the UI of the first application | 414 |

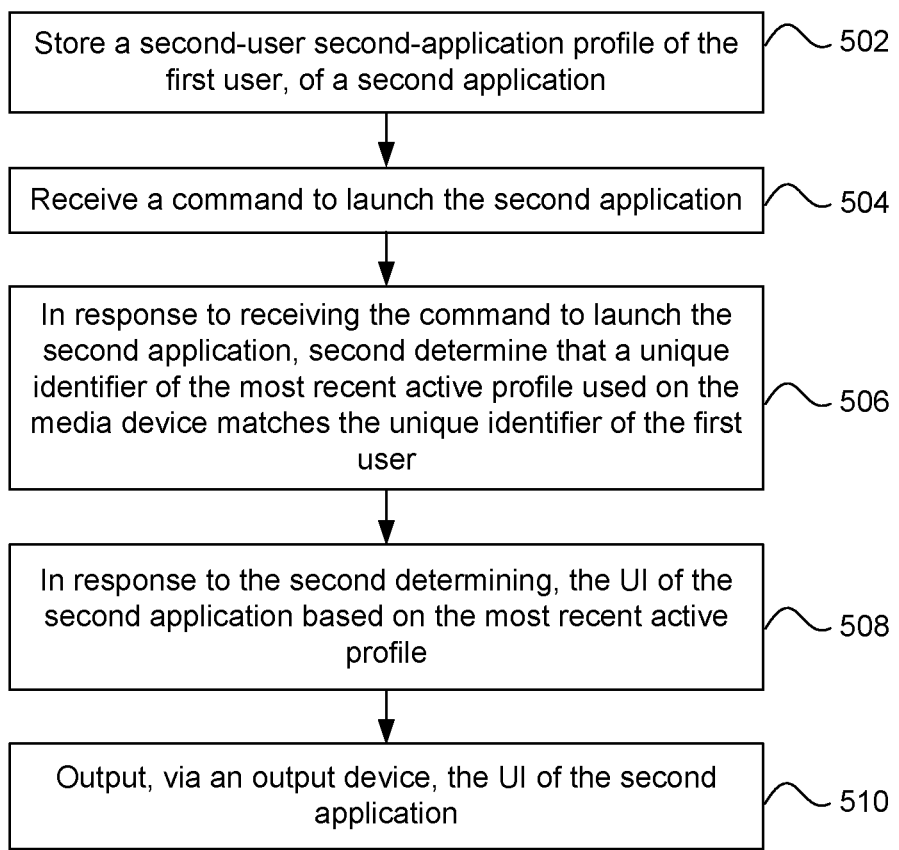

Store a second-user second-application profile of the first user, of a second application — 502

Receive a command to launch the second application — 504

In response to receiving the command to launch the second application, second determine that a unique identifier of the most recent active profile used on the media device matches the unique identifier of the first user — 506

In response to the second determining, the UI of the second application based on the most recent active profile — 508

Output, via an output device, the UI of the second application — 510

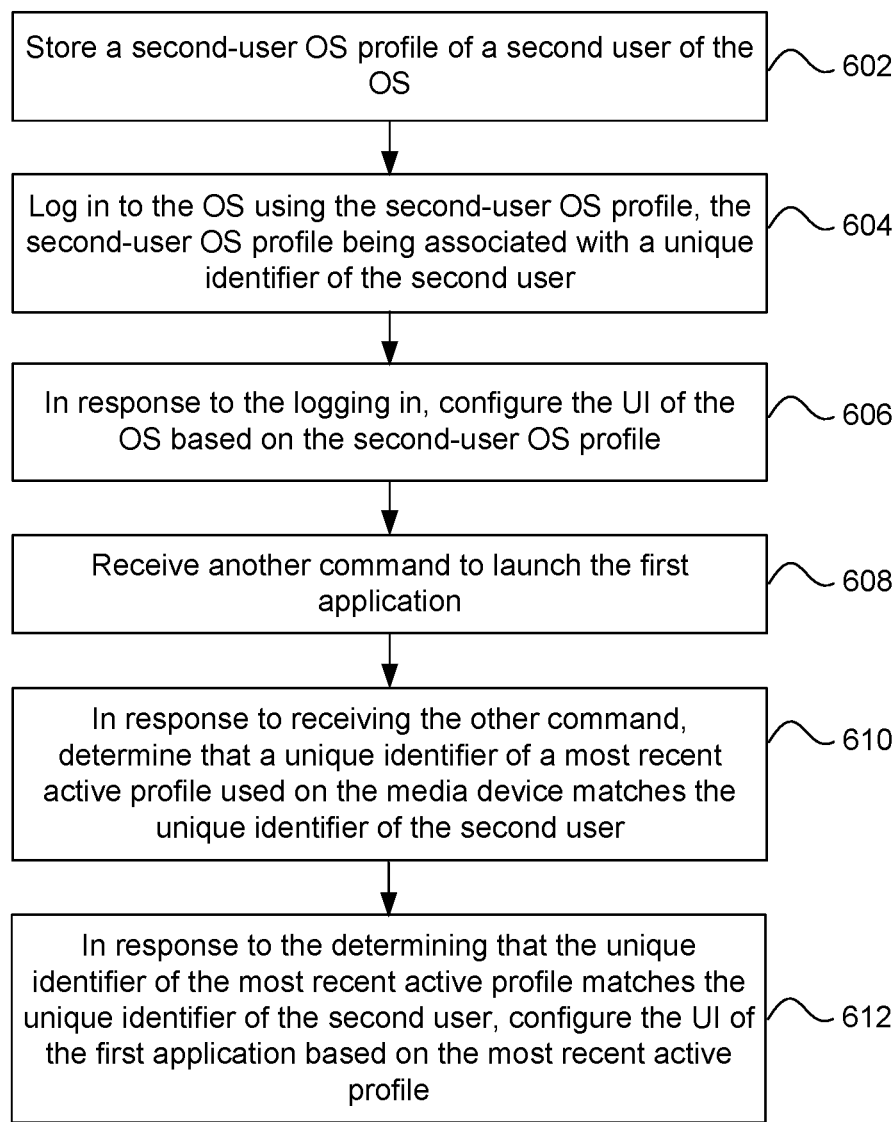

Store a second-user OS profile of a second user of the OS ~602

Log in to the OS using the second-user OS profile, the second-user OS profile being associated with a unique identifier of the second user ~604

In response to the logging in, configure the UI of the OS based on the second-user OS profile ~606

Receive another command to launch the first application ~608

In response to receiving the other command, determine that a unique identifier of a most recent active profile used on the media device matches the unique identifier of the second user ~610

In response to the determining that the unique identifier of the most recent active profile matches the unique identifier of the second user, configure the UI of the first application based on the most recent active profile ~612

FIG. 6

ASSOCIATION OF MEDIA DEVICE PROFILES AND APPLICATION PROFILES FOR A SEAMLESS VIEWING EXPERIENCE

BACKGROUND

Field

This disclosure is generally directed to user profile associations in a media device for streaming video content, and more particularly to providing a seamless integration between user profiles on the media device and profiles within partner streaming apps.

SUMMARY

Provided herein are system, apparatus, article of manufacture, method and/or computer program product aspects, and/or combinations and sub-combinations thereof, for seamless and uninterrupted viewing transitions between display content in an operating system (OS) user interface (UI) and display content in a video streaming application UI.

An example aspect operates by a method implemented with a media device having an OS. The method includes configuring a user interface (UI) of the OS of the media device based on a first-user OS profile corresponding to a first user. The first-user OS profile is associated with a unique identifier of the first user. The method also includes receiving a command to launch a first application of the plurality of applications. The method also includes, in response to receiving the command, determining that a unique identifier of a most recent active profile used on the media device matches the unique identifier of the first user. The method also includes, in response to the determining, configuring a UI of the first application based on the most recent active profile. The method also includes outputting, via an output device, the UI of the first application.

Another example aspect includes a system having one or more memories and at least one processor coupled to at least one of the memories. The one or more memories store an OS. The at least one processor performs operations that include configuring a user interface (UI) of the OS based on a first-user OS profile corresponding to a first user. The first-user OS profile is associated with a unique identifier of the first user. The operations also include receiving a command to launch a first application of the plurality of applications. The operations also include, in response to receiving the command, determining that a unique identifier of a most recent active profile used on the system matches the unique identifier of the first user. The operations also include, in response to the determining, configuring a UI of the first application based on the most recent active profile. The operations also include outputting, via an output device, the UI of the first application.

Another example aspect includes a non-transitory computer-readable medium having instructions stored thereon that, when executed by at least one computing device, cause the at least one computing device to perform operations that include running an OS of a media device. The operations also include configuring a user interface (UI) of the OS based on a first-user OS profile corresponding to a first user. The first-user OS profile is associated with a unique identifier of the first user. The operations also include receiving a command to a first application. The operations also include, in response to receiving the command, determining that a unique identifier of a most recent active profile used on the media device matches the unique identifier of the first user. The operations also include, in response to the determining, configuring a UI of the first application based on the most recent active profile. The operations also include outputting, via an output device, the UI of the first application.

BRIEF DESCRIPTION OF THE FIGURES

The accompanying drawings are incorporated herein and form a part of the specification.

FIG. 4 illustrates a flowchart of a method for reducing prompt-based interruptions for a user of a streaming media device, according to some aspects.

FIG. 5 illustrates a flowchart of a method for reducing prompt-based interruptions for a user of a streaming media device with multiple applications, according to some aspects.

FIG. 6 illustrates a flowchart of a method for reducing prompt-based interruptions for multiple users of a streaming media device, according to some aspects.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product aspects, and/or combinations and sub-combinations thereof, for seamless and uninterrupted transitions between a user interface (UI) of an operating system (OS) and a UI of an application for media content. From a viewpoint of a consumer of media content (e.g., video streaming, audio streaming, e-book download) the consumer's experience in using an application for media content may be unsatisfactory if the user is beset by delays and interruptions as part of normal operations of the application. For example, a media device may interrupt a user's experience by prompting the user to provide authentication credentials. In another example, a delay may be caused when a user, attempting to resume viewing/listening unfinished media content, has to manually navigate to the specific content by launching the streaming application only to be interrupted by a prompt to select a user profile from among a plurality of user profiles. To solve the above technological problems, aspects herein rely on the profile that was most recently active on the media device. This provides for a more pleasant and enjoyable user experience because interruptions are circumvented (e.g., prompts for user-input are bypassed).

Figure 1:
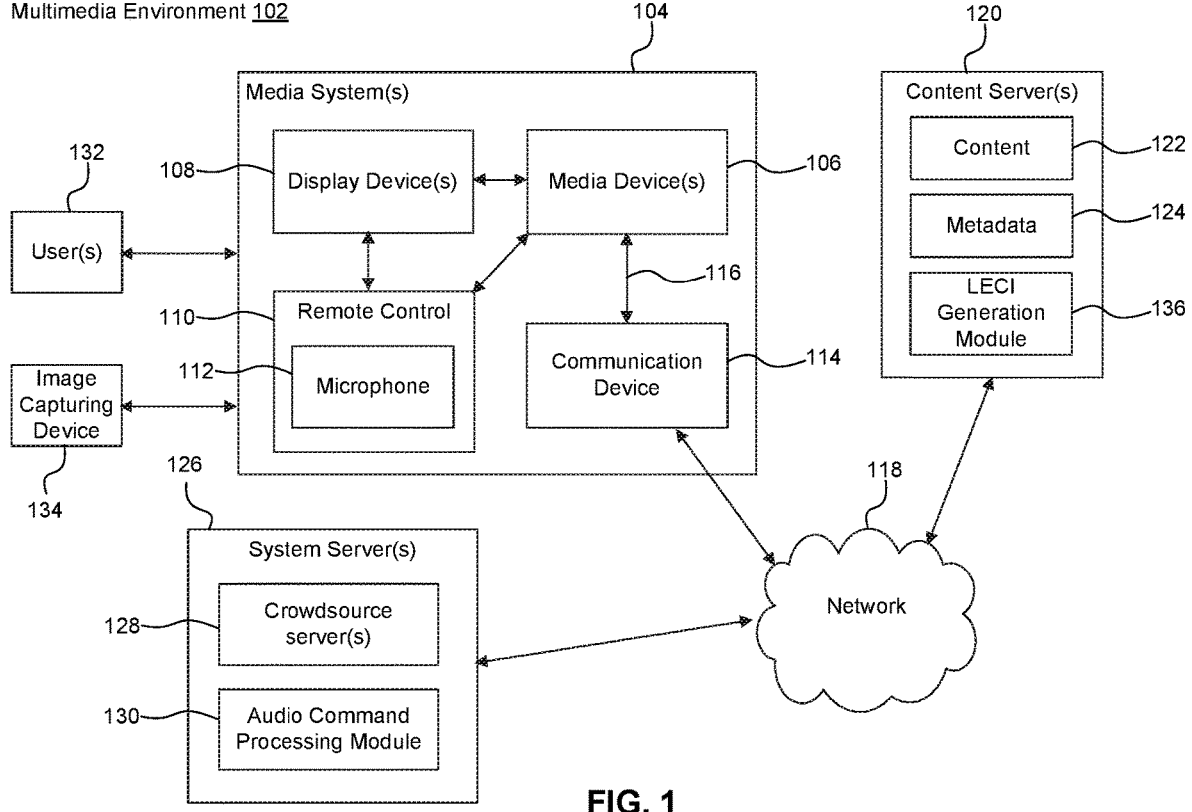
FIG. 1 illustrates a block diagram of a multimedia environment, according to some aspects.

Various aspects of this disclosure may be implemented using and/or may be part of a multimedia environment 102 shown in FIG. 1. It is noted, however, that multimedia environment 102 is provided solely for illustrative purposes, and is not limiting. Aspects of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some aspects. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some aspects, media device 106 may be a part of, integrated with, operatively coupled to, and/or connected to its respective display device 108. A smart TV is an example of a display device with an integrated media device.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In some aspects, the network 118 may include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 may be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In some aspects, the remote control 110 wirelessly communicates with the media device 106 and/or display device 108 using cellular, Bluetooth, infrared, millimeter wave, acoustic signals, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some aspects, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing aspects and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some aspects, the media device 106 may be audio responsive, and the audio data may represent verbal commands from the user 132 to control the media device 106 as well as other components in the media system 104, such as the display device 108.

In some aspects, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
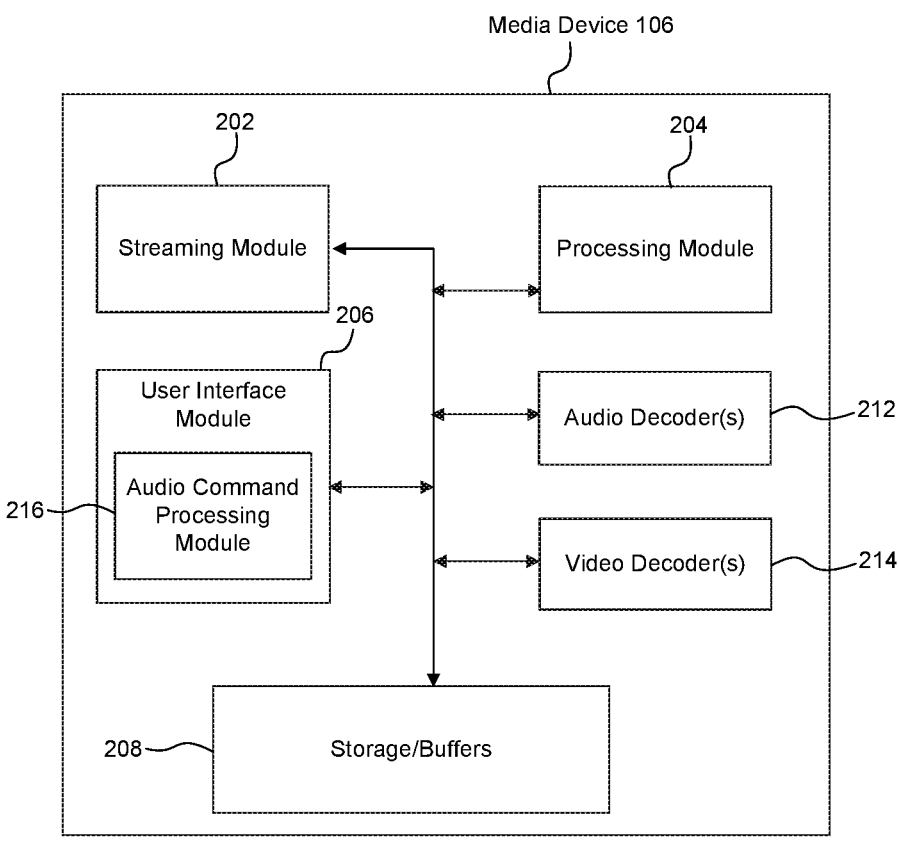
FIG. 2 illustrates a block diagram of a streaming media device, according to some aspects.

In some aspects, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some aspects. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some aspects, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming aspects, the streaming module 202 may transmit the content to the display device 108 in real time or near real time as it receives such content from the content server(s) 120. In non-streaming aspects, the media device 106 may store the content received from content server(s) 120 in storage/buffers 208 for later playback on display device 108.

Reduced Prompt-Based Interruptions for Users of a Media Device

Referring to FIG. 1, the media devices 106 may exist in thousands or millions of media systems 104. One or more of media systems 104 may have multiple users (e.g., two or more users). Media device 106 may implement and store profiles for each user that interacts with media device 106. For example, media device 106 may store, for each user, an OS profile, an application profile for an application (e.g., streaming application), another application profile for another application, and so on. The profiles may also be stored at a remote location (e.g., at system server(s) 126) for system restore or synchronization purposes.

In order to provide a user experience with reduced interruptions, media device 106 may circumvent interruptions by relying on user-unique identifiers associated with OS profile(s) and application profile(s). For example, when a user is authenticated to use an OS UI of media device 106, and the same user desires to launch an application from the UI of the OS, the launching of the application may include bypassing authentication that would normally be requested upon launching the application based on the unique identifier for the user being associated with both the OS and the application profiles. For example, a prompt for user-profile selection is bypassed by automatically configuring the UI of the application with the user profile of the user based on the unique identifier associated with the most recently active profile in a previous instance (e.g., when the UI of the OS was running).

Figure 3:
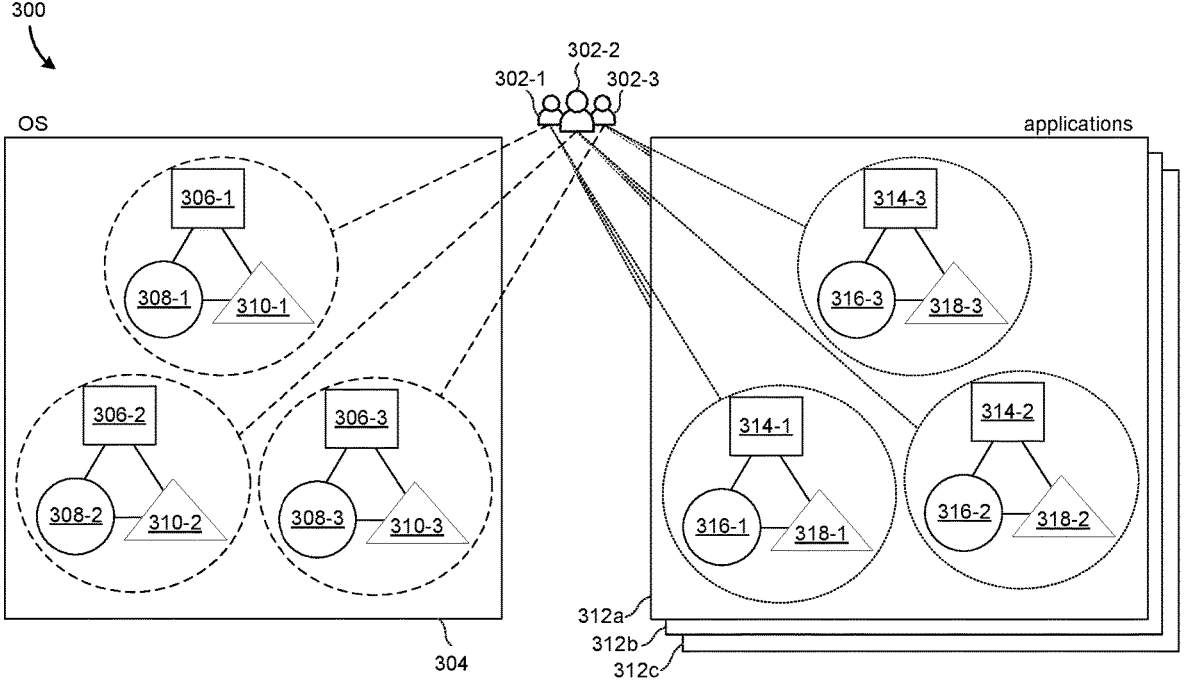
FIG. 3 illustrates an organization structure for user information of a streaming media device, according to some aspects.

FIG. 3 shows an organization structure for user information 300, according to some aspects. User information 300 may be implemented with media device 106 of FIG. 1. At least a portion of user information 300 may be stored on a non-transitory computer-readable medium of media device 106. A portion of user information 300 may be stored on a server. The non-transitory computer-readable medium of media device 106 may also store software instructions for the OS of media device 106, as well as software for one or more applications. The one or more applications may include one or more applications for media content (e.g., for streaming content 122 of FIG. 1).

In some aspects, users of media device 106 of FIG. 1 may include users 302-$i$, which corresponds to users 132 of FIG. 1. The index i is used to distinguish between two or more users. The non-limiting example in FIG. 3 illustrates three users (there may be more or fewer users as would be appreciated by a person of ordinary skill in the art). The OS of media device 106 of FIG. 1 may be associated with OS data 304. OS data 304 may include data that assists the functions of the OS. OS data 304 may include OS user profiles, information about each user for determining content to be displayed on display device 108 of FIG. 1, and/or metadata to go along with the OS user profiles. In some aspects, for each user 302-$i$, OS data 304 may include corresponding OS profile 306-$i$, OS metadata 308-$i$, and content information 310-$i$.

It is to be appreciated that display content is not limited to visual content viewable on display device 108. In some aspects, display device 108 can be generalized to any suitable output device based on the type of content (e.g., speaker/audio player for audio content). Therefore, descriptions referring to video content and display device 108 may also refer to media content and output devices in general.

In some aspects, one or more applications stored on media device 106 of FIG. 1 are associated with application data 312$j$. The index j is used to denote between two or more applications. The non-limiting example in FIG. 3 illustrates three applications (there may be more or fewer applications as would be appreciated by a person of ordinary skill in the art). Application data 312$j$ may include data that assists in the functions of the one or more applications. Application data 312$j$ may include application user profiles, information about each user for determining content to be output on an output device, and metadata to go along with the application user profiles. In some aspects, for each user 302-$i$, each of application data 312$j$ includes corresponding application profile 314-$i$, application metadata 316-$i$, and content information 318-*i*. As before, the indices i=1, 2, 3 may represent correspondences to a first user, a second user, and a third user.

In some aspects, enumerative adjectives (e.g., "first," "second," "third," or the like) may be used for facilitating the description of elements without establishing an order, hierarchy, quantity, or permanent numeric assignment of the elements (unless otherwise noted). For example, an application may arbitrarily be referred to as a "first application," "second application," or the like.

Merely to facilitate description of drawn elements in the figures, some aspects will be described using the following terms. Users 302-1, 302-2, and 302-3 may be referred to as first, second, and third users, respectively. OS profiles 306-1, 306-2, and 306-3 may be referred to as first-user OS profile, second-user OS profile, and third-user OS profile, respectively. OS metadata 308-1, 308-2, and 308-3 may be referred to as first-user OS metadata, second-user OS metadata, and third-user OS metadata, respectively. Content information 310-1, 310-2, and 310-3 may be referred to as first-user OS content information, second-user OS content information, and third-user OS content information, respectively. For ease of reference, the applications that correspond to application data 312*a*, 312*b*, and 312*c* shall also be identified by the same reference numbers and may be referred to as first application (312*a*), second application (312*b*), and third application (312*c*). For the first application (312*a*), application profiles 314-1, 314-2, and 314-3 may be referred to as first-user first-application profile, second-user first-application profile, and third-user first-application profile. For the second application (312*b*), application profiles 314-1, 314-2, and 314-3 may be referred to as first-user second-application profile, second-user second-application profile, and third-user second-application profile. For the third application (312*c*), application profiles 314-1, 314-2, and 314-3 may be referred to as first-user third-application profile, second-user third-application profile, and third-user third-application profile. A similar nomenclature may be applied to application metadata 316-*i*, and content information 318-*i* for each of the first application (312*a*), the second application (312*b*), and the third application (312*c*) (e.g., second-user third-application (312*c*) metadata 316-2).

FIG. 4 is a flowchart for a method 400 for reducing interruptions and intervening actions for users of a media device, according to some aspects. Method 400 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1-3. However, method 400 is not limited to the example aspects of FIGS. 1-3.

In some aspects, at step 402, media device 106 optionally stores first-user OS profile 306-1. As would be appreciated by a person of ordinary skill in the art, not just first-user OS profile 306-1, but one or more of the user profiles disclosed herein can be stored as described above in reference to FIG. 3 (e.g., at media device 106 and/or system server(s) 126). Media device 106 may execute/launch applications via an OS. First-user OS profile 306-1 may be active when first user 302-1 uses the UI of the OS of media device 106. At least a portion of the information of any OS profile 306-*i* may also be stored remote from media device 106 (e.g., at system server(s) 126) for retrieval using another media device. The remotely stored profile information may be retrieved using a different media device (e.g., a media device at a temporary lodging).

In some aspects, at step 404, media device 106 optionally stores first-user first-application profile 314-1. One or more of the applications associated with application data 312*j* may be used for outputting content via an output device (e.g., stream video content on display device 108). At least a portion of the information of any of application profile(s) 314-*i* of any of application data 312*j* may also be stored remote from media device 106 (e.g., at system server(s) 126) for retrieval using another media device. The remotely stored profile information may be retrieved using a different media device (e.g., a media device at another user's home).

In some aspects, at step 406, media device 106 configures a UI of the OS of media device 106 based on the first-user OS profile 306-1. First-user OS profile 306-1 may be associated with a unique identifier of first user 302-1. First-user OS metadata 308-1 can comprise the unique identifier of first-user 302-1. The configuring of the UI of the OS may include, for example, populating a content selection menu according to first-user content information 310-1, to be output along with the UI of the OS UI. The UI of the OS may include, for example, an indicator of the active profile (first-user OS profile 306-1 in this example), user preferences and/or settings for first user 302-1 (e.g., stored as first-user OS metadata 308-1), and/or suggestions of available actions (e.g., launch a recently used application, a listing of executable applications/channels) according to first-user OS content information 310-1.

In some aspects, at step 408, media device 106 receives a command to launch a first application. The command may be transmitted, for example, via remote control 110 (FIG. 1).

In some aspects, when transitioning from one UI to another UI, undesirable interruption may occur. For example, when launching the UI of the first application (312*a*) from UI of the OS (e.g., while having first-user OS profile 306-1 active), the UI of the first application (312*a*) may pause in order to prompt the user to select which profile the user would like to proceed with (e.g., select from among first-user first-application profile 314-1 (312*a*), second-user first-application profile 314-2 (312*a*), and third-user first-application profile 314-3 (312*a*)). The interruption caused by the prompt may cause inconvenience and frustration to the user, who is already logged in under first-user OS profile 306-1.

Hence, in some aspects, at step 410, in response to receiving the command, media device 106 determines that a unique identifier of a most recent active profile used on media device 106 matches the unique identifier of one of the users (e.g., matches the unique identifier of first user 302-1). Explained in different words, media device 106 may perform a check to ascertain which user's OS profile was the most recent one to be active, from among known OS profiles. The check may include determining whether a unique identifier of a most recent active profile used on media device 106 matches the unique identifier user 302-1, 302-2, or 302-3. The unique identifier of first user 302-1 is associated with not only first-user OS profile 306-1, but is also associated with the first-user first-application profile 314-1 (312*a*), the first-user second-application profile 314-1 (312*b*), and the first-user third-application profile 314-1 (312*c*). A similar relationship follows for the unique identifiers of second user 302-2 and third user 302-3. In other words, media device 106, upon launch of the first application (312*a*), may determine whether the unique identifier of the first user 302-1 (logged in under first-user OS profile 306-1) is associated with one of the unique identifiers of application profiles 314-i.

In some aspects, at step 412, in response to the determining of step 410, media device 106 configures a UI of the first application (312a) based on the most recent active profile—in this example, it would be based on first-user OS profile 306-1 as it was the active profile upon launch of the first application (312a). Since the unique identifier is also associated with first-user first-application profile 314-1 (312a), media device 106 may configure the UI of the first application (312a) using first-user first-application 314-1 (312a), first-user first-application metadata 316-1 (312a), and/or first-user first-application content information 318-1 (312a). The configuring of the UI of the first application (312a) may bypass a prompt for user-selection (e.g., an authentication prompt) by issuing or transmitting the unique identifier of the most recent active profile to the first application (312a). The configuring of the UI of the first application (312a) may include outputting an indicator of the active profile (first-user first-application profile 314-1 (312a) in this example), user preferences and/or settings for first user 302-1 (e.g., stored as first-user first-application metadata 316-1 (312a)), and/or suggestions of available actions (e.g., video recommendations or suggestions, listen recommendations or suggestions, continue-watching/continue-listening recommendations) according to first-user first-application content information 318-1 (312a).

In some aspects, at step 414, media device 106 outputs the UI of the first application (312a) via an output device (e.g., a display, a speaker, an audio player, a smart TV, or the like). The outputting of the UI of the first application (312a) may overlap or replace the UI of the OS entirely. Or the outputting of the UI of the first application (312a) may partially overlap or run in parallel with the UI of the OS (e.g., picture-in-picture).

In some aspects, the transition from UI of the OS to the UI of the first application (312a) or any application may be even more streamlined and efficient by allowing bypass of certain actions/interruptions. Using video streaming as an example, streamlining functions may include launching the first application (312a) and automatically resuming an unfinished video (e.g., user 302-1 selects a continue-watching suggestion from the UI of the OS). Since the unique identifier of first user 302-1 is associated with the OS and the different applications, it is envisaged that the different UIs (of the OS and the applications) can cross-load content for more streamlined loading of content with fewer intervening actions.

FIG. 5 is a flowchart for a method 500 for reducing interruptions and intervening actions for users of a media device, according to some aspects. Method 500 provides features in addition to those of method 400 in FIG. 4. Method 500 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIGS. 1-4. However, method 500 is not limited to the example aspects of FIGS. 1-4.

In some aspects, at step 502, media device 106 optionally stores first-user second-application profile 314-1 (312b).

In some aspects, at step 504, media device 106 receives a command to launch the second application (312b). The command may be transmitted, for example, via remote control 110 (FIG. 1).

In some aspects, at step 506, in response to receiving the command, media device 106 performs a further determining step (that is, further to the determining at step 410). Media device 106 determines that a unique identifier of a most recent active profile used on media device 106 matches the unique identifier of first user 302-1. This step can be performed regardless of which UI is the instant output at the output device (e.g., can be performed while in the UI of the OS or the UI of the first application (312b)).

In some aspects, at step 508, in response to the second determining of step 506, media device 106 configures a UI of the second application (312b) based on the most recent active profile—in this example, it would be based on first-user first-application profile 314-1 (312a) as it was the active profile upon launch of the second application (312b). But it may also or alternatively be based on first-user OS profile 306-1 (e.g., it was active via picture-in-picture). The configuring of the UI of the second application (312a) may bypass a prompt for user-selection (e.g., an authentication prompt) by issuing or transmitting the unique identifier of the most recent active profile to the second application (312b). The configuring of the UI of the second application (312b) may include outputting an indicator of the active profile (first-user second-application profile 314-1 (312b) in this example), user preferences and/or settings for first user 302-1 (e.g., stored as first-user second-application metadata 316-1 (312b)), and/or suggestions of available actions (e.g., video recommendations or suggestions, listen recommendations or suggestions, continue-watching/continue-listening recommendations) according to first-user second-application content information 318-1 (312b).

In some aspects, at step 510, media device 106 outputs the UI of the second application (312b) via an output device (e.g., a display, a speaker, an audio player, a smart TV, or the like). The outputting of the UI of the first application (312a) may overlap or replace the UIs of the OS and/or first application (312a) entirely. Or the outputting of the UI of the second application (312b) may partially overlap or run in parallel with the UIs of the OS and/or the first application (312a) (e.g., picture-in-picture).

FIG. 6 is a flowchart for a method 600 for reducing interruptions and intervening actions for users of a media device, according to some aspects. Method 600 provides features in addition to those of methods 400 and/or 500 in FIGS. 4 and 5. Method 600 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIGS. 1-5. However, method 600 is not limited to the example aspects of FIGS. 1-5. Method 600 may be used to reduce fragmentation of viewing experience for multiple users.

In some aspects, at step 602, media device 106 optionally stores a second-user OS profile 306-2 is stored.

In some aspects, at step 604, media device 106 logs in to the OS using second-user OS profile 306-2. Logging into the OS can be performed by media device 106 in response to a command (e.g., second-user OS profile 306-2 is selected via remote control 110 (FIG. 1)). Second-user OS profile 306-2 is associated with a unique identifier of second user 302-2.

In some aspects, at step 606, in response to the logging in, media device 106 configures a UI of the OS of media device 106 based on second-user OS profile 306-2. Second-user OS metadata 308-2 can comprise the unique identifier of first-user 302-2. The configuring of the UI of the OS may include, for example, populating a content selection menu according to second-user content information 310-2, to be output along with the UI of the OS UI. The UI of the OS may include, for example, an indicator of the active profile (second-user OS profile 306-2 in this example), user preferences and/or settings for second user 302-2 (e.g., stored as second-user OS metadata 308-2), and/or suggestions of available actions (e.g., launch a recently used application, a listing of executable applications/channels) according to second-user OS content information 310-2.

In some aspects, at step 608, media device 106 receives another command to launch the first application (312*a*). The other command may be transmitted, for example, via remote control 110 (FIG. 1).

In some aspects, the reduction of prompt-based interruptions can be extended to different users, including second user 302-2. At step 510, in response to receiving the other command, it is determined that a unique identifier of a most recent active profile used on media device 106 matches the unique identifier of second user 302-2. The unique identifier of second user 302-2 is associated with not only second-user OS profile 306-2, but is also associated with the second-user first-application profile 314-2 (312*a*), the second-user second-application profile 314-2 (312*b*), and the second-user third-application profile 314-2 (312*c*). In other words, media device 106, upon launch of the first application (312*a*), may determine whether the unique identifier of second user 302-2 (logged in under second-user OS profile 306-2) is associated with one of the application profiles 314-*i*.

In some aspects, at step 612, in response to the determining of step 610, a UI of the first application (312*a*) is configured based on the most recent active profile—in this example, it would be based on second-user OS profile 306-2 as it was the active profile upon launch of the first application (312*a*). Since the unique identifier is also associated with second-user first-application profile 314-2 (312*a*), media device 106 may configure the UI of the first application (312*a*) using second-user first-application 314-2 (312*a*), second-user first-application metadata 316-2 (312*a*), and/or second-user first-application content information 318-2 (312*a*). The configuring of the UI of the first application (312*a*) may bypass a prompt for user-selection (e.g., an authentication prompt) by issuing or transmitting the unique identifier of the most recent active profile to the first application (312*a*). The configuring of the UI of the first application (312*a*) may include outputting an indicator of the active profile (second-user first-application profile 314-2 (312*a*) in this example), user preferences and/or settings for user 302-2 (e.g., stored as second-user first-application metadata 316-2 (312*a*)), and/or suggestions of available actions (e.g., video recommendations or suggestions, listen recommendations or suggestions, continue-watching/continue-listening recommendations) according to second-user first-application content information 318-2 (312*a*). Further streamlining functions can be implemented as described above in reference to first user 302-1.

In some aspects, profiles may be associated with personal identification numbers (PINs). PINs may be included as metadata associated with the profiles. PINs may be used for parental control and age-restriction of media content. Parental controls may trigger prompts for verification when switching from one UI to another UI, causing undesirable interruptions for a user. For example, let user 302-2 be an adult user (e.g., no parental restrictions to content). Let user 302-1 be a minor under parental control restrictions. Let the minor's profiles be the most recent active profiles in the OS UI and an application UI (in this example, first-user OS profile 306-1 and first-user first-application profile 314-1 (312*a*)), thereby temporarily restricting the contents loaded on the UIs of the OS and the first application (312*a*) as age-restricted content until the parental restriction is lifted. In this scenario, as user 302-2 attempts to lift the age restriction, media device 106 may prompt the user to provide a PIN (e.g., a parental control PIN). If user 302-2 provides the PIN via the UI of the OS (thereby undoing the age restriction in the UI of the OS, but not in the UI of the first application (312*a*)), media device 106 may issue a second prompt when user 302-2 tries to access the UI of the first application (312*a*). Therefore, to avoid undesirable prompt-based interruptions, some aspects of the present disclosure implement a PIN along with one or more of the steps of methods 400, 500, and 600.

In some aspects, first-user OS profile 306-1 may be associated with a PIN. First-user first-application profile 314-1 (312*a*) may also be associated with the PIN. First-user OS content 310-1 may reflect information pertaining to age-restricted content. First-user first-application content 318-1 (312*a*) may reflect information pertaining to age-restricted content.

In some aspects, the determining at step 410 may include media device 106 determining that the PIN of the most recent active profile matches the PIN of the first-user first-application profile 314-1 (312*a*). In response to the determining that the PIN of the most recent active profile matches the PIN of the first-user first-application profile 314-1 (312*a*), the UI of the first application may be configured based on the PIN, using the age-filtered content corresponding to first user 302-1.

In some aspects, media device 106 may output a prompt for the PIN when media device 106 receives a command to access content that is outside of the age-restrictions associated with user 302-1. For example, the logging in at step 604 may entail supplying the PIN to media device 106 when attempting to use media device 106 under profiles associated with second user 302-2. The configuring of the UI of the OS can then follow as in step 606.

In some aspects, while supplying the PIN at the OS level can lift age restrictions at the UI of the OS, it may not be so for the applications that use second-user application profiles 314-2. Media device 106 may further prompt for age-restriction-lifting credentials when transitioning from the UI of the OS to a UI of an application, which may be avoided by implementing aspects of the present disclosure.

In some aspects, a command to launch a second application can be received at media device 106. Rather than requesting the PIN a second time (already supplied at the OS level), media device may perform steps analogous to 610 and 612. For example, in response to receiving the command to launch the second application, media device 106 determines whether the unique identifier of the most recent active profile matches the unique identifier of the second user. In response to the determining that the unique identifier of the most recent active profile matches the unique identifier of the second user and in response to logging in to the OS using the PIN, the UI of the second application is configured based on second-user second-application profile 314-2 (312b). Thus, bypassing of a request for age-restriction-lifting credentials is achieved based on the second-user second-application profile being associated with the unique identifier that matches that of the most recent active profile.

In some aspects, the use of PINs is not limited to parental control. PINs or other forms of authentication may be implemented in other use cases in which content is tailored for a given content-type for given attributes of a user, age being one example of an attribute.

In some aspects, though some example scenarios disclosed herein have been described with respect to a specific user (e.g., user 302-1) and/or application(s) for streaming, it is to be understood that the functions disclosed herein are not limited to the user(s)/application(s) used in the examples herein. It is envisaged that the steps of methods 400, 500, and/or 600 of FIGS. 4-6 may be permutated to include different combinations of users and applications, as well as extrapolated to include more users and more applications.

In some aspects, a profile may be instantiated when media device 106 receives an input from one of users 302-i. Inputs described herein may encompass any manner of input. For example, an input may include an electromagnetic signal (e.g., infrared, millimeter wave), an audio command received at microphone 112, scanning of a QR code using a digital camera, etc. Furthermore, methods disclosed herein may include a step of analyzing the input to determine a position of a user based on the analyzing. Then, media device 106 may instantiate a given profile, the given profile corresponding to a position of the user (e.g., predicting an identity of a user based on a position of the user relative to media system 104), thereby allowing the user to access profile and content with fewer authentication steps. Identification of a user's identity is not limited to position (e.g., maybe identified by voice recognition, millimeter wave, etc.).

In some aspects, metadata 308-i and 316-i may include one or more from among watch history information, continue-watching information, watch recommendation information, payment information (e.g., saved credit card information), audio setting information, video setting information, and/or accessibility setting information (e.g., closed captioning). Settings and preferences may be seamlessly and automatically be implemented based on the determining at step 410. For example, if user 302-1 prefers a particular volume for certain video content, a more convenient and unfragmented viewing experience may be provided to user 302-1 by automatically setting the volume to a preferred level without user 302-1 having to manually set the volume.

Example Computer System

Figure 7:
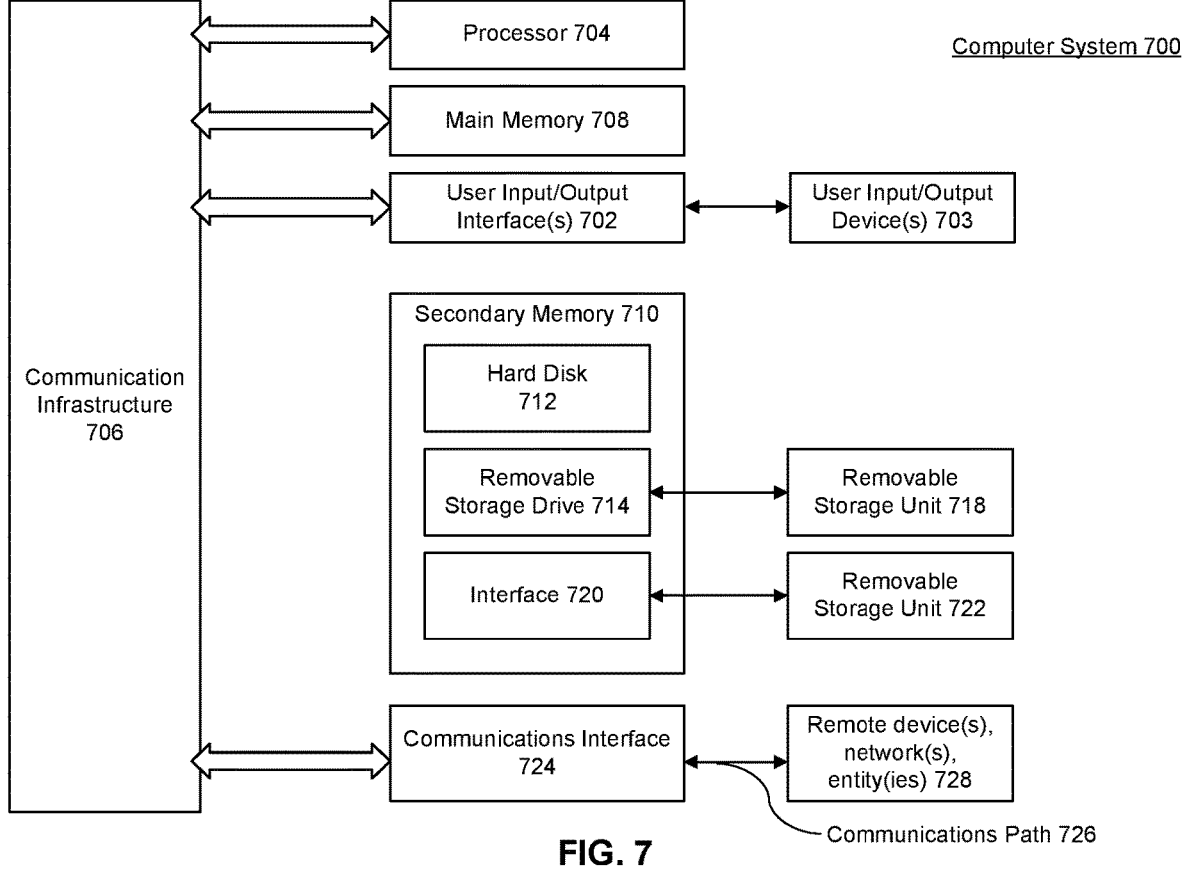
FIG. 7 illustrates an example computer system useful for implementing various aspects.

Various aspects may be implemented, for example, using one or more well-known computer systems, such as computer system 700 shown in FIG. 7. For example, the media device 106 may be implemented using combinations or sub-combinations of computer system 700. Also or alternatively, one or more computer systems 700 may be used, for example, to implement any of the aspects discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In some aspects, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 7. In particular, aspects may operate with software, hardware, and/or operating system implementations other than those described herein.

CONCLUSION

It is to be appreciated that the Detailed Description section, and not any other section, is intended to be used to interpret the claims. Other sections may set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative aspects may perform functional blocks, steps, operations, methods, etc. using orderings different than those described herein.

References herein to "one aspect," "an aspect," "an example aspect," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects may be described using the expression "coupled" and "connected" along with their derivatives. These terms are not necessarily intended as synonyms for each other. For example, some aspects may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A computer-implemented method for reducing prompt-based interruptions for a user of a media device configured to run a plurality of applications using an operating system (OS) of the media device, the computer-implemented method comprising:

configuring a user interface (UI) of the OS of the media device based on a first-user OS profile corresponding to a first user, wherein the first-user OS profile is associated with a unique identifier of the first user;

receiving a command to launch a first application of the plurality of applications;

in response to receiving the command, determining that a unique identifier of a most recent active profile used on the media device matches the unique identifier of the first user;

in response to the determining, configuring a UI of the first application based on the most recent active profile;

logging in to the OS using a second-user OS profile, wherein the second-user OS profile corresponds to a second user, and the second-user OS profile is associated with a unique identifier of the second user;

in response to the logging in, configuring the UI of the OS based on the second-user OS profile;

receiving another command to launch the first application;

in response to receiving the other command, determining that the unique identifier of the most recent active profile matches the unique identifier of the second user;

in response to the determining that the unique identifier of the most recent active profile matches the unique identifier of the second user, configuring the UI of the first application based on a second-user first-application profile corresponding to the second user and to the first application, wherein the second-user first-application profile is associated with the unique identifier of the second user; and outputting, via an output device, the UI of the first application.

2. The computer-implemented method of claim 1, wherein the outputting comprises outputting the UI of the first application in place of the UI of the OS.

3. The computer-implemented method of claim 1, wherein the configuring of the UI of the first application comprises:

bypassing an authentication prompt of the first application by issuing the unique identifier of the most recent active profile to the first application.

4. The computer-implemented method of claim 1, further comprising:

receiving a command to launch a second application of the plurality of applications;

in response to receiving the command to launch the second application, second determining that the unique identifier of the most recent active profile used on the media device matches the unique identifier of the first user;

in response to the second determining, configuring a UI of the second application based on the most recent active profile; and outputting, via the output device, the UI of the second application.

5. The computer-implemented method of claim 1, further comprising:

in response to receiving the command, determining that a PIN of the most recent active profile matches a PIN associated with a first-user first-application profile and the first-user OS profile, wherein the first-user first-application profile corresponds to the first user and to the first application.

6. The computer-implemented method of claim 5, further comprising:

in response to the determining that the PIN of the most recent active profile matches the PIN associated with the first-user first-application profile, configuring, based on the PIN of the most recent active profile, the UI of the first application using age-filtered content corresponding to the first user.

7. A system for reducing prompt-based interruptions for a user, the system comprising:

one or more memories configured to store an operating system (OS) and a plurality of applications; and at least one processor each coupled to at least one of the memories and configured to perform operations comprising:

configuring a user interface (UI) of the OS based on a first-user OS profile corresponding to a first user, wherein the first-user OS profile is associated with a unique identifier of the first user;

receiving a command to launch a first application of the plurality of applications;

in response to receiving the command, determining that a unique identifier of a most recent active profile used on the system matches the unique identifier of the first user;

in response to the determining, configuring a UI of the first application based on the most recent active profile;

logging in to the OS using a second-user OS profile, wherein the second-user OS profile corresponds to a second user, and the second-user OS profile is associated with a unique identifier of the second user;

in response to the logging in, configuring the UI of the OS based on the second-user OS profile;

receiving another command to launch the first application;

in response to receiving the other command, determining that the unique identifier of the most recent active profile matches the unique identifier of the second user;

in response to the determining that the unique identifier of the most recent active profile matches the unique identifier of the second user, configuring the UI of the first application based on a second-user first-application profile corresponding to the second user and to the first application, wherein the second-user first-application profile is associated with the unique identifier of the second user; and outputting, via an output device, the UI of the first application.

8. The system of claim 7, wherein the outputting comprises outputting the UI of the first application in place of the UI of the OS.

9. The system of claim 7, wherein the configuring of the UI of the first application comprises:

bypassing an authentication prompt of the first application by issuing the unique identifier of the most recent active profile to the first application.

10. The system of claim 7, wherein the operations further comprise:

receiving a command to launch a second application of the plurality of applications;

in response to receiving the command to launch the second application, second determining that the unique identifier of the most recent active profile used on the system matches the unique identifier of the first user;

in response to the second determining, configuring a UI of the second application based on the most recent active profile; and outputting, via the output device, the UI of the second application.

11. The system of claim 7, wherein the operations further comprise:

in response to receiving the command, determining that a PIN of the most recent active profile matches a PIN associated with a first-user first-application profile and the first-user OS profile, wherein the first-user first-application profile corresponds to the first user and to the first application.

12. The system of claim 11, wherein the operations further comprise:

in response to the determining that the PIN of the most recent active profile matches the PIN associated with the first-user first-application profile, configuring, based on the PIN of the most recent active profile, the UI of the first application using age-filtered content corresponding to the first user.

13. A non-transitory computer-readable medium having instructions stored thereon that, when executed by at least one computing device, cause the at least one computing device to perform operations comprising:

running an operating system (OS) of a media device;

configuring a user interface (UI) of the OS based on a first-user OS profile corresponding to a first user, wherein the first-user OS profile is associated with a unique identifier of the first user;

receiving a command to a first application;

in response to receiving the command, determining that a unique identifier of a most recent active profile used on the media device matches the unique identifier of the first user;

in response to the determining, configuring a UI of the first application based on the most recent active profile;

logging in to the OS using a second-user OS profile, wherein the second-user OS profile corresponds to a second user, and the second-user OS profile is associated with a unique identifier of the second user;

in response to the logging in, configuring the UI of the OS based on the second-user OS profile;

receiving another command to launch the first application;

in response to receiving the other command, determining that the unique identifier of the most recent active profile matches the unique identifier of the second user;

in response to the determining that the unique identifier of the most recent active profile matches the unique identifier of the second user, configuring the UI of the first application based on a second-user first-application profile corresponding to the second user and to the first application, wherein the second-user first-application profile is associated with the unique identifier of the second user; and outputting, via an output device, the UI of the first application.

14. The non-transitory computer-readable medium of claim 13, wherein the outputting comprises outputting the UI of the first application in place of the UI of the OS.

15. The non-transitory computer-readable medium of claim 13, wherein the configuring of the UI of the first application comprises:

bypassing an authentication prompt of the first application by issuing the unique identifier of the most recent active profile to the first application.

16. The non-transitory computer-readable medium of claim 13, wherein the operations further comprise:

receiving a command to launch a second application;

in response to receiving the command to launch the second application, second determining that the unique identifier of the most recent active profile used on the media device matches the unique identifier of the first user;

in response to the second determining, configuring a UI of the second application based on the most recent active profile; and outputting, via the output device, the UI of the second application.

17. The non-transitory computer-readable medium of claim 13, wherein the operations further comprise:

in response to receiving the command, determining that a PIN of the most recent active profile matches a PIN associated with a first-user first-application profile and the first-user OS profile, wherein the first-user first-application profile corresponds to the first user and to the first application; and in response to the determining that the PIN of the most recent active profile matches the PIN associated with the first-user first-application profile, configuring, based on the PIN of the most recent active profile, the UI of the first application using age-filtered content corresponding to the first user.

*     *     *     *     *